No. 880,742. PATENTED MAR. 3, 1908.
D. J. KELLY.
METHOD OF REMOVING CAKED MATERIAL FROM PRESSURE FILTERS.
APPLICATION FILED JAN. 5, 1907.

Witnesses
Inventor
David J. Kelly
By T. Walter Fowler
his Attorney

UNITED STATES PATENT OFFICE.

DAVID J. KELLY, OF SALT LAKE CITY, UTAH, ASSIGNOR TO THE KELLY FILTER PRESS CO., OF SALT LAKE CITY, UTAH, A CORPORATION OF UTAH.

METHOD OF REMOVING CAKED MATERIAL FROM PRESSURE-FILTERS.

No. 880,742.  Specification of Letters Patent.  Patented March 3, 1908.

Application filed January 5, 1907. Serial No. 350,972.

*To all whom it may concern:*

Be it known that I, DAVID J. KELLY, a citizen of the United States, residing at Salt Lake City, in the county of Salt Lake and State of Utah, have invented new and useful Improvements in Methods of Removing Caked Material from Pressure-Filters, of which the following is a specification.

My invention relates to a new and useful method of loosening caked solid material from the sides of porous pressure filters, and my invention consists, essentially, in the admission of steam to the inside of a hollow filter having porous walls, whereby the steam expands and penetrates the pores of the filter sides from the inside and attacks and softens the adhering inner side of the caked material and forms a film of moisture thereon which loosens the contact of the caked material and allows said material to "slick off" so that it may be discharged in substantially a compact form.

In the accompanying drawing I illustrate a simple form of apparatus capable of carrying out my process, but I do not limit my process to this or to any particular apparatus except that whatever the form of apparatus used there must be present a hollow filter having porous walls and a steam supply which shall deliver steam into the space between the inner walls of the filter.

Figure 1:
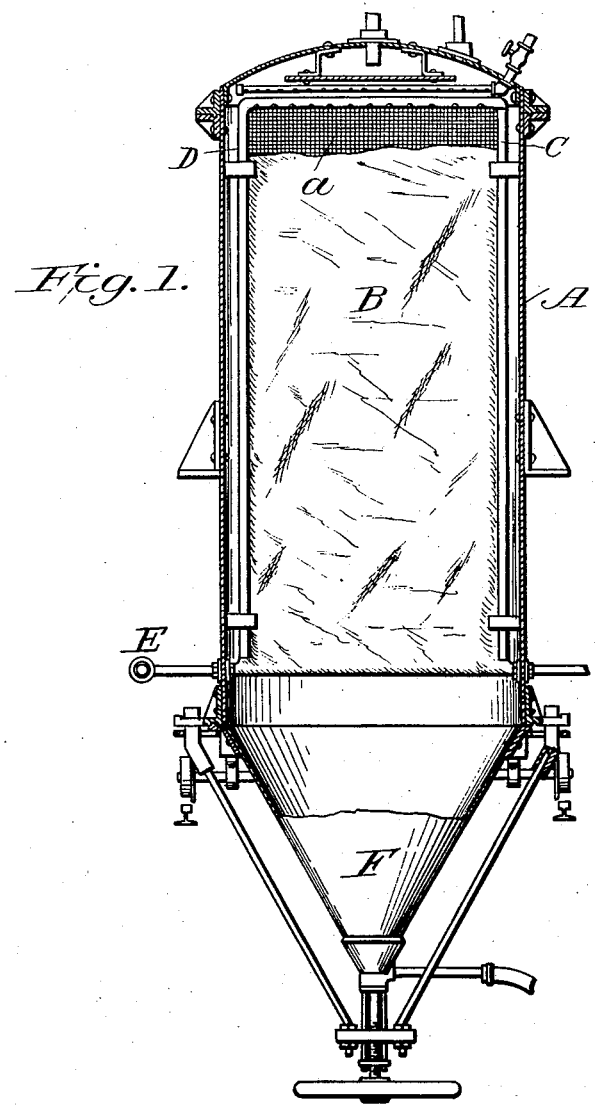
Figure 2:
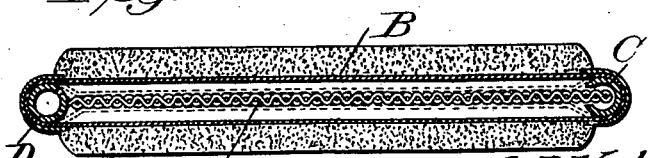

In said drawing, Figure 1, represents a part elevation and part sectional view of a pressure filter tank and a pressure filter diaphragm supported therein. Fig. 2, is a cross sectional view of the filter diaphragm.

My method is applicable to any art wherein it is desired to separate liquids from solid matter held in suspension and where the solid matter is collected in cake-like form upon the outer sides of a pressure filter. For instance, my method will be found of great value in the art of metallurgy in separating slimes from which precious metals have been dissolved and the liquid which holds the precious metals in solution; it is also useful in the sugar industry.

The type of apparatus herein shown as illustrative of one form of apparatus which I may use for carrying out my method is substantially disclosed in an application filed by me on the 5th day of January, 1907, Serial Number 350,971, and which apparatus comprises a pressure tank A, a pressure filter B therein and comprising canvas or other fabric forming a tight bag-like inclosure upon the outer surface of whose porous sides the solid material is collected in cake-form. Interior to this hollow filter is a foraminous or other plate $a$ and along the sides of this plate within said bag-like inclosure, are the pipes C and D one, C, being slotted longitudinally to receive the separated liquid and deliver the same outside the filter, and the other, D, being a steam pipe leading from a main E or other source of supply and delivering live steam directly into the hollow central space of the filter. The tank may have a removable hopper-bottom F which when opened allows the loosened slime cake to be discharged from the tank by gravity in substantially a compact form.

In carrying out my process the material to be separated is delivered into the tank in any well known manner under whatever pressure may be desired, or found necessary. The pressure of the solution in the tank forces the liquid constituents through the pores of the canvas or other sides of the filter to the inside from whence it is delivered by pipe C; the solid constituents of the solution being too coarse to pass through the pores of the canvas bank upon the outer sides thereof, and form a cake of more or less hardened compact material. When this cake builds to a desirable thickness, the supply of solution is cut-off and the excess liquid having been drained from the pressure tank and the bottom of same is removed, I now admit a volume of steam into said space through the pipe D. The steam upon entering the hollow interior of the filter at once expands and fills the space between the inner surfaces of the porous filter sides and passes through the pores in a direction opposite to that in which the solution passed through said sides, consequently the steam first attacks the inner surface of the caked material and softens or dissolves the same until it forms a thin film of moisture thereon with the result that the bond between the caked material and the pores of the filter sides is ruptured and the said material is permitted to "slick off". As this operation occurs before the caked material will become saturated with moisture from the steam, it is manifest that said material is thus permitted to be discharged by gravity and in a more or less compact form through the open bottom of the tank, and without the assistance of mechanical or other scraping devices. The steam also cleanses and opens the pores of the filter sides for a succeeding cycle of operation.

I am aware that an expansible dry fluid, as compressed air, and also water under pressure have been employed for loosening caked-material from the porous sides of hollow filters and accordingly I do not claim the use of such substances as my invention. When compressed air is used, the expansive force of the same acts upon the caked-material so as to practically disintegrate it by forcibly ripping it from the sides of the filter; when water is used, the cake becomes supersaturated and again disintegrated. But when using steam and loosening the hardened cake by simply creating a film of slime upon the inner adhering sides, I do not materially disturb the internal and outer structure of the cake therefore I am enabled to deliver the cake from the tank in substantially compact form.

My process is, of course, equally applicable to suction filters as well as pressure filters and therefore it is not limited to the latter. In a suction filter, the pipe conforming to the discharge pipe for filtered solution in the pressure filter is connected to a suction pipe, and the filter diaphragm being submerged in slime pulp, or like material to be filtered, in an open tank, an external or atmospheric pressure is created in place of direct pressure by means of a pressure tank. The caked material can be removed from the suction type of filter in the same manner as from the pressure type.

Having thus described my invention, what I claim as new and desire to secure by Letters Patent is:—

The process herein described of removing solid material adhering to the outer porous sides of a hollow filter, which process consists in admitting a volume of steam to the interior of the filter between said sides so that it will expand therein and outwardly penetrate the pores of the filter and form a film of moisture on the inner surface of the solid material, and thereby allow said solid material to detach itself, in compact form, from the filter sides.

In testimony whereof I have hereunto set my hand in presence of two subscribing witnesses.

DAVID J. KELLY.

Witnesses:
ALBERT L. O. GENTER,
ERNEST GAYFORD.